(12) United States Patent
Bang et al.

(10) Patent No.: US 6,411,271 B1
(45) Date of Patent: Jun. 25, 2002

(54) LIQUID CRYSTAL DISPLAY

(75) Inventors: Il-Soon Bang, Suwon-si; Byeong-Yong Song, Incheon-si; Joo-Hwan Ji, Seoul, all of (KR)

(73) Assignee: Samsung Electronics Co., Ltd., Suwon (KR)

( * ) Notice: Subject to any disclaimer, the term of this patent is extended or adjusted under 35 U.S.C. 154(b) by 0 days.

(21) Appl. No.: 09/267,377

(22) Filed: Mar. 15, 1999

(30) Foreign Application Priority Data

Mar. 18, 1998 (KR) .............................................. 98-9299
Mar. 18, 1998 (KR) .............................................. 98-9300

(51) Int. Cl.[7] .............................. G09G 3/36; H05K 7/16
(52) U.S. Cl. ........................ 345/87; D14/113; 248/920; 361/681
(58) Field of Search .................... 345/905, 87; 361/681, 361/600, 679, 683, 686, 724, 726; 248/917, 924, 920; D14/113

(56) References Cited

U.S. PATENT DOCUMENTS

| | | | | |
|---|---|---|---|---|
| 4,669,694 A | * | 6/1987 | Malick | 248/397 |
| D389,462 S | * | 1/1998 | Johns et al. | D14/100 |
| 5,831,696 A | * | 11/1998 | Sheng | 349/58 |
| 5,833,183 A | * | 11/1998 | Chang | 248/176.1 |
| D404,381 S | * | 1/1999 | Roderman et al. | D14/113 |
| D421,601 S | * | 3/2000 | Chou | D14/375 |

OTHER PUBLICATIONS

Sales sheet for Ta Ta Industrial Co., Ltd. TA–1302/1702 monitors, from Global Sources web page at www.edatech-.com.tw (includes enlargement).*

* cited by examiner

Primary Examiner—Steven Saras
Assistant Examiner—William C. Spencer
(74) Attorney, Agent, or Firm—Robert E. Bushnell, Esq.

(57) ABSTRACT

A liquid crystal display including many speakers within a stand and having a display unit, a display angle of which can be adjusted by a cam in order that a user can conveniently see it. The stand supports the display unit through a support and has an inclined part between a front part and a rear part. In addition, a speaker for outputting a high-pitched sound is installed within the front part of the stand and speakers for outputting a middle-low pitched sound are installed within the both sides of the stand. The support is rotatably connected to the display unit and the stand by a driving of the cam and contacted with the cam provided to toe inclined part of the stand and the angle of the support is adjusted by a rotation of the cam and so an angle of the display unit is adjusted.

18 Claims, 8 Drawing Sheets

LIQUID CRYSTAL DISPLAY

CLAIM OF PRIORITY

This application makes reference to, incorporates the same herein, and claims all benefits accruing under 35 U.S.C. §119 from my application entitled Monitor Having A Display Angle Control Cam and Monitor Having Stand Structure Within Speaker filed with the Korean Industrial Property Office on Mar. 18, 1998 and there duly assigned Serial No. P98-09299 and P98-09300 by that Office.

BACKGROUND OF THE INVENTION

1. Field of the Invention

The present invention relates to a monitor, more particularly to a liquid crystal display having a liquid crystal display unit displaying images, a place of which and a distance of which from a user can be adjusted by a cam so that a user could easily see it, and having a speaker installed within a stand.

2. Discussion of Related Art

In general, a monitor consists of a display unit displaying images in accordance with signals for displaying and a stand holding up the display unit. Conventionally, a hinge is used to adjust the place or orientation of a display in order for a user to easily see images of the display and is used to connect the display to the stand.

This conventional hinge has a swiveling function to adjust the angle of right-left orientation of a display of a display unit as well as a tilting function to adjust the angle of front-rear orientation of the display. Swiveling refers to the display unit rotating around the hinge in the right-left direction while tilting refers to the display unit rotating around the hinge in the upward-downward direction. Therefore, adjusting an angle of right-left and upward-downward directions of the display unit, a user is able to adjust the place of the display unit so as to easily watch displayed images.

However, such a conventional hinge has a relatively complicated structure to adjust the angles of right-left and upward-downward directions of the display unit. This contributes to increased cost of the monitor.

Further, when a user adjusts an angle of the display unit, an excessive force is given to the display unit and the hinge operates hastily, catching and slipping. That makes line adjustment of the display unit difficult. Consequently, the adjustment of an angle of the display unit must be repeated several times to achieve accurate adjustment.

In addition, a conventional monitor also suffers from a difficulty in accurately adjusting an angle of the display unit because the stand supporting the display unit is not able to maintain stability and moves together with the display unit when a user adjusts an angle of the display unit, owing to the light weight of the liquid crystal display unit. Furthermore, as the audio function of the monitor is important as well as the video function and the conventional monitor uses an attached external speaker, a disorganized arrangement of the user's space results from the external speaker.

SUMMARY OF THE INVENTION

Therefore, it is an object of the present invention to provide an improved monitor.

It is a further object of the present invention to provide a monitor designed for use with a liquid crystal display.

It is a yet further object of the present invention to provide a less expensive monitor.

It is a still further object to provide a monitor which allows fine adjustment of the display angle.

It is another object to provide a monitor which makes angle adjustment of the display easy.

It is still another object to provide a monitor which allows for a more organized desktop.

It is yet another object to provide a monitor whose base does not slip on the desktop when the display is adjusted.

To achieve these objects and other advantages and in accordance with the purpose of the present invention, as embodied and broadly described, there is provided a liquid crystal display comprising: a display unit displaying images in accordance with signals for displaying; a stand supporting the display unit, being provided with a plurality of speakers in a front side as well as both sides, and including a curved front part, a rear part having a lower height than the front part and an inclined part between the front part and the rear part; a support supporting the display unit to the stand, having one end portion rotatably connected to a rear side of the display unit and the other end portion rotatably connected to the rear part of the stand; and a means located in the inclined part of the stand for adjusting an angle of the display unit.

Herein the means is rotatably installed in the inclined part of the stand and includes a cam shaft having a knob in one side and a cam provided in a middle of the cam shaft to actuate the support. The support has a concave surface being contacted with the cam so as to support the display unit and an upper portion thereof being located in front of the cam. The cam, when rotated, is rotatably received in a concavity provided in the inclined part of the stand and is stopped by being contacted with a bottom surface of the concavity and the cam shaft is closely combined with a shaft hole formed in the stand.

A speaker provided in the front surface of the stand is for outputting a high-pitched sound while speakers provided in both sides of the stand are for outputting a middle-low pitched sound.

According to another aspect of the present invention, there is also provided a liquid crystal display comprising: a display unit displaying images in accordance with signals for displaying; a stand supporting the display unit, being provided with a plurality of speakers in a front side as well as both sides, and including a curved front part, a rear part having a lower height than the front part and an inclined part between the front part and the rear part; a support supporting the display unit to the stand, having one end portion rotatably connected to a rear side of the display unit and the other end portion rotatably connected to the rear part of the stand; and a means for adjusting an angle of the display unit, the means positioned in the inclined part to be located behind an upper end of the support.

BRIEF DESCRIPTION OF THE ATTACHED DRAWINGS

A more complete appreciation of the invention, and many of the attendant advantages thereof, will be readily apparent as the same becomes better understood by reference to the following detailed description when considered in conjunction with the accompanying drawings in which like reference symbols represent the same or similar components, wherein:

FIG. 6a–6b are sectional side views illustrating an adjustment of a first display angle of the monitor according to the present invention;

DETAILED DESCRIPTION OF PREFERRED EMBODIMENT

Figure 1:
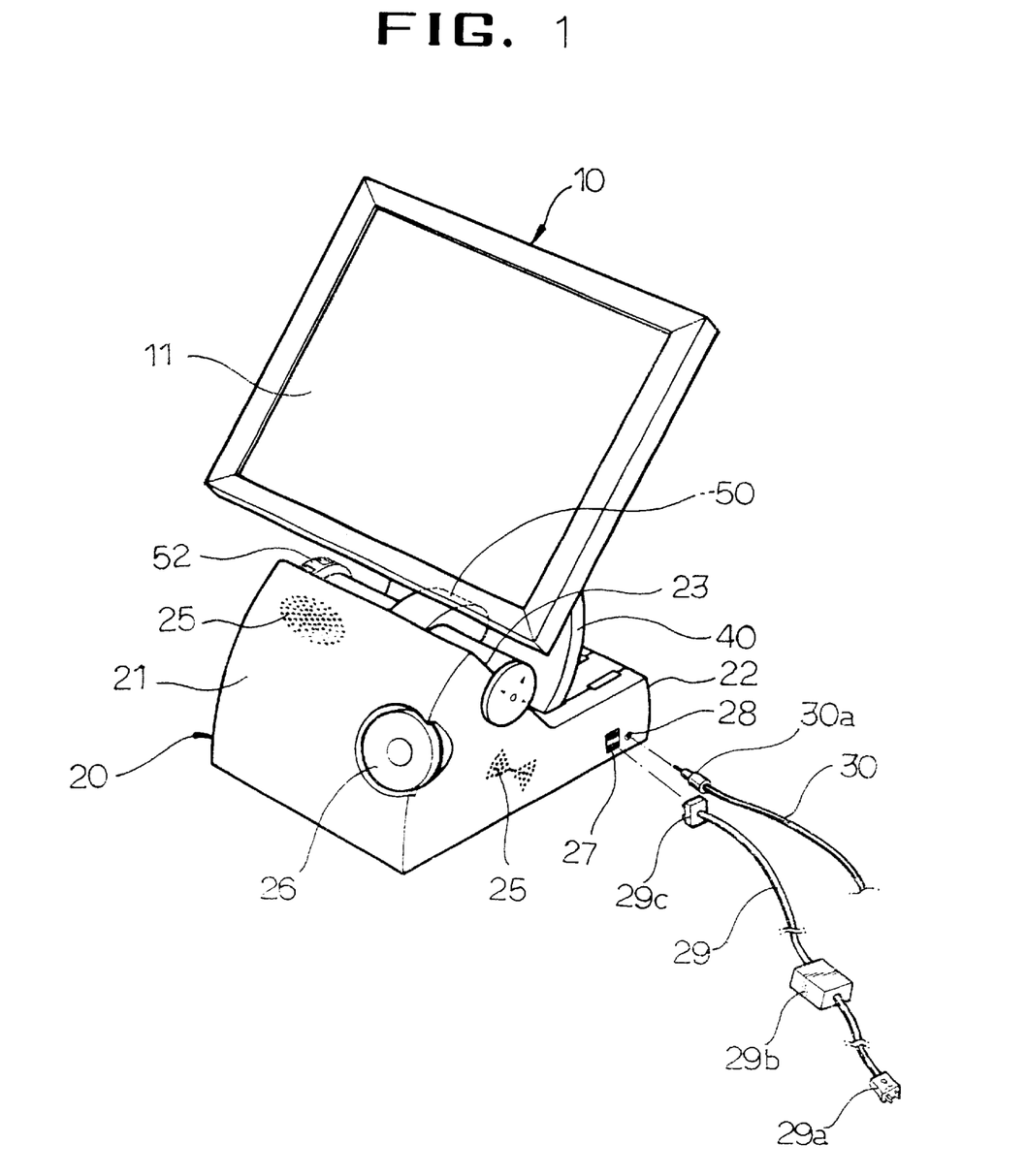
FIG. 1 is a perspective view of a monitor according to the present invention.

A monitor according to the present invention will be apparent from the following detailed description in conjunction with the accompanying drawings. FIG. 1 is a perspective view illustrating the monitor according to this invention and FIG. 2 is a perspective view illustrating a rear side of the monitor in the separated state of a display unit and a stand supporting the display unit from the monitor illustrated in FIG. 1.

Figure 2:
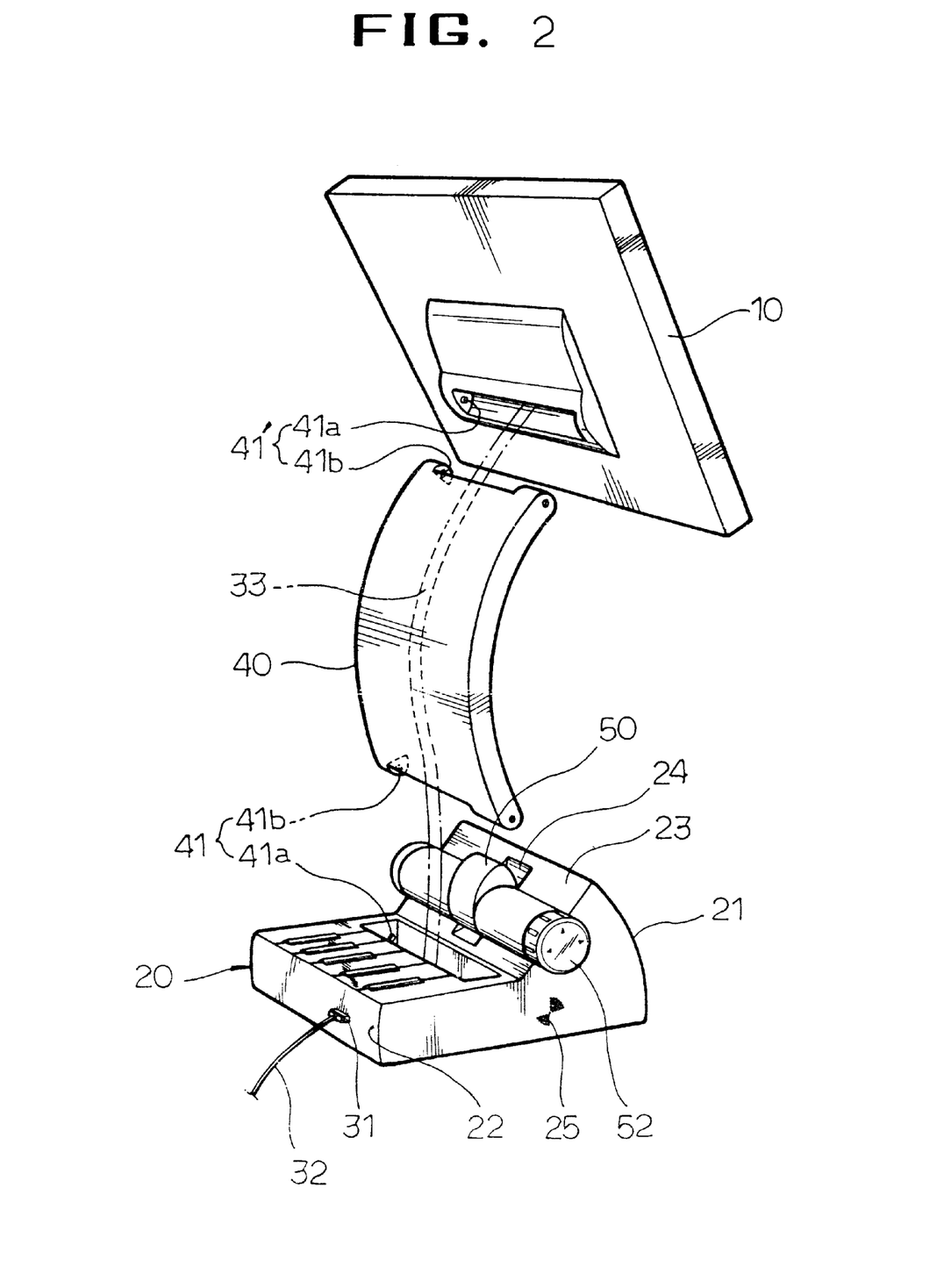
FIG. 2 is a perspective view separating representative assembling parts of a monitor according to the present invention and illustrating a rear side thereof.

Referring to FIG. 1–2, the display unit 10 displays images according to signals for displaying and a stand 20 supports the display unit 10. The stand 20 is provided with a front section 21 having a shape, in cross-section, of a circular arc and a rear section 22 having a lower height than the front section 21 and an inclined section 23 between the front section 21 and the rear section 22. The inclined section 23 is provided with a means for adjusting an angle of the display 11. The stand 20 has such a shape in order to cover up a means for adjusting an angle of the display 11 with the front section 21 from the front perspective, as the means is installed on the inclined section 23.

The means for adjusting an angle of the display 11 includes a cam 50 being rotatably installed in a concavity 24 formed in a middle part of the inclined section 23 and a cam mechanism 51 (See FIG. 3) upholding the rotation of the cam 50.

Figure 6A:
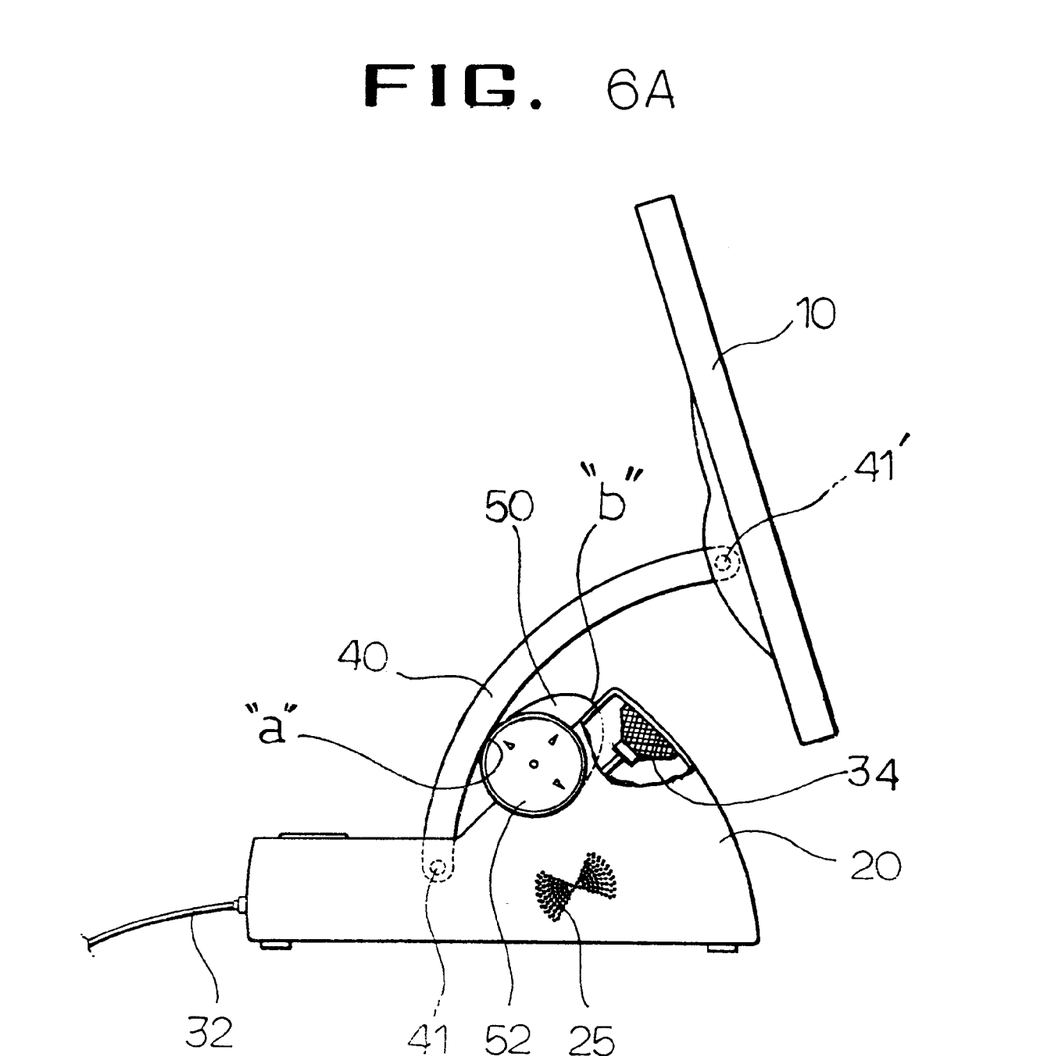
FIG. 6a is a sectional side view illustrating a forward moving operation state of a support by the cam.
Figure 6B:
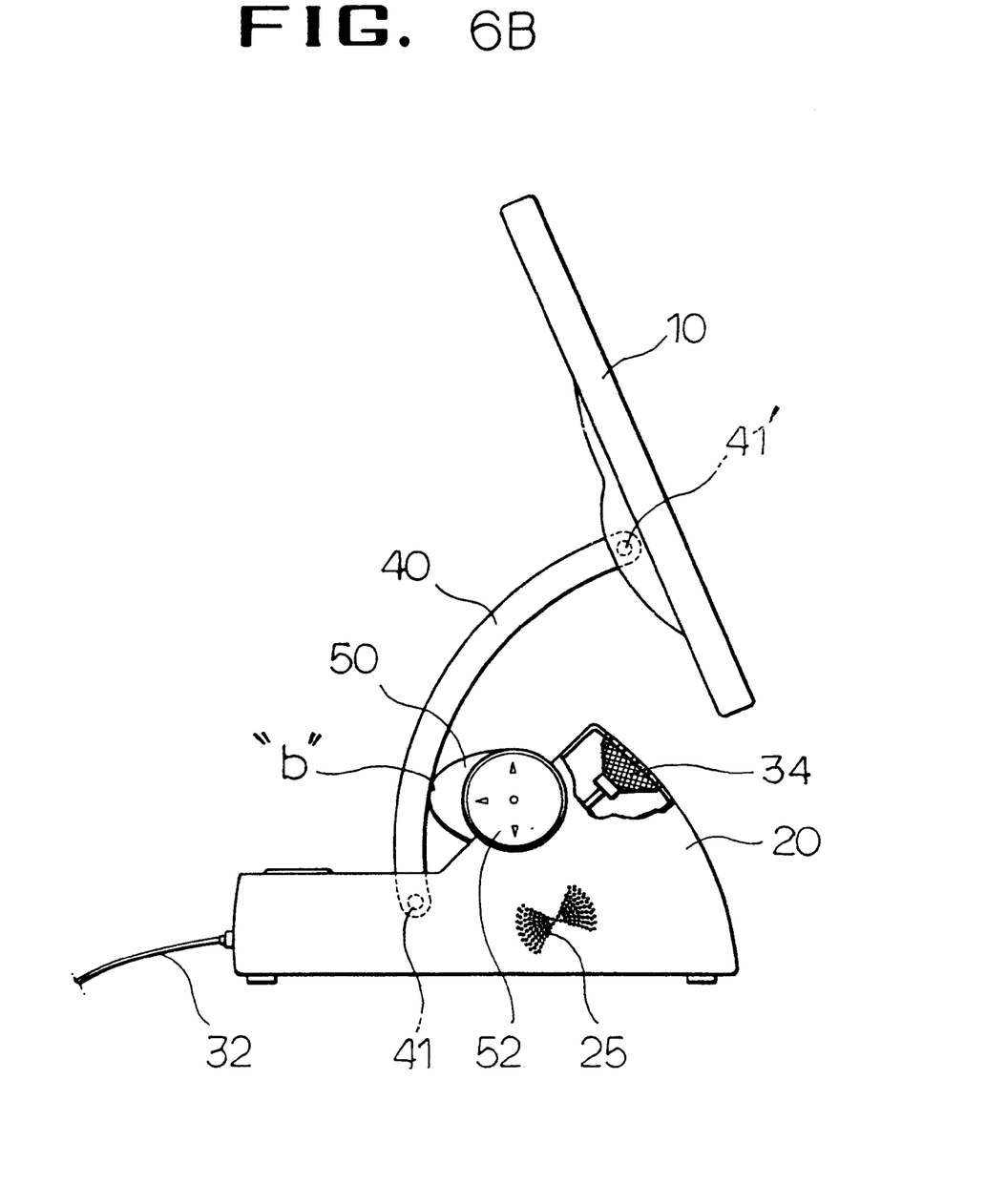
FIG. 6b is a sectional side view illustrating a backward moving operation state of a support by the cam.
Figure 6C:
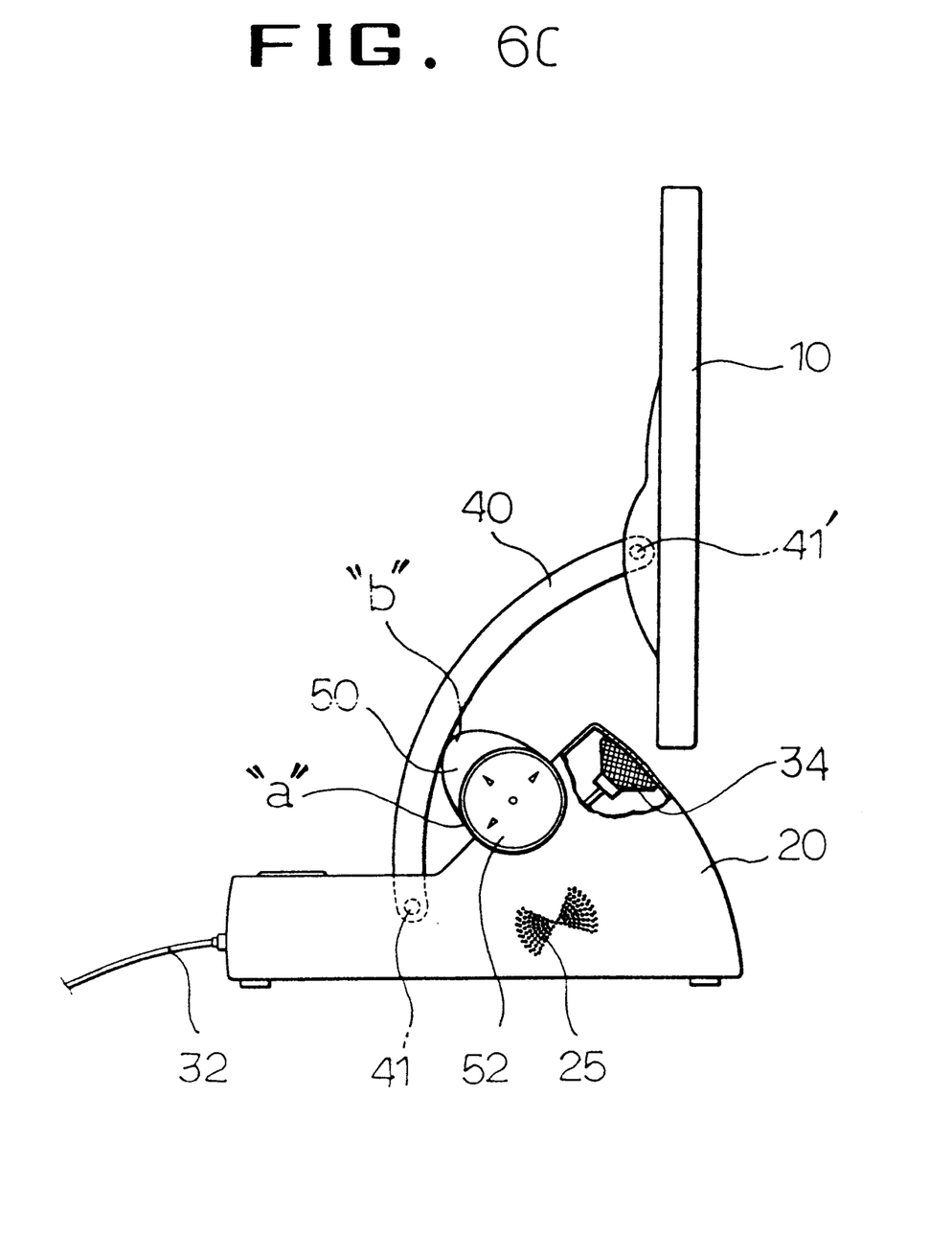
FIG. 6c is a sectional side view illustrating a halfway moving operation state of a support by the cam.
Figure 7:
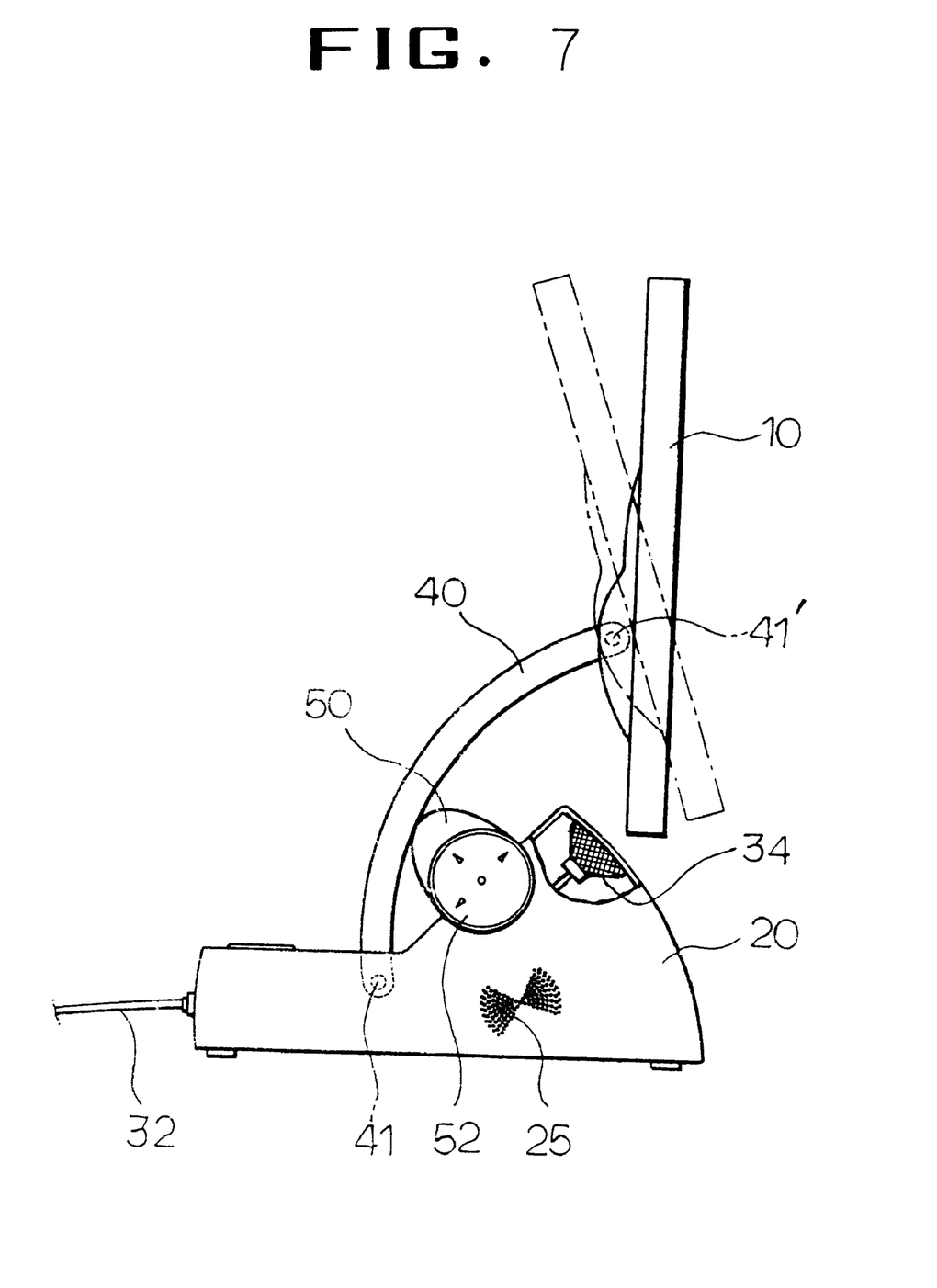
FIG. 7 is a sectional side view illustrating an adjustment of a second display angle of the monitor according to the present invention.

As shown in FIG. 1, 6 and 7, the stand 20 is provided with speakers 34, 34' within the front section 21 and both sides. Parts for installing speakers are provided with speaker holes 25 consisting of a large number of holes. The speaker 34 provided within the front section 21 is for outputting a high-pitched sound and the speaker 34' provided within both sides is for outputting a middle low-pitched sound. A sound level of these speakers 34, 34' is adjusted by a speaker volume switch 26 provided in the front section 21 of the stand. This speaker volume switch 26 is provided as a rotating switch in order to be readily handled. However, other switches may be also used. In addition, one side of the stand 20 is provided with a speaker power input port 27 for supplying power to the speakers 34, 34' and a speaker signal input port 28 for inputting signals to the speakers 34, 34'.

The speaker power input port 27 is connected with a power plug 29a connected to an external power and a connector 29c of a power cable 29 having an adapter 29b. The speaker signal input port 28 is connected with a jack 30a of a speaker signal cable 30 and the speaker signal cable 30 is connected with a device for generating image signals such as a computer or a television transmitting images as well as sound signals.

Referring to FIG. 2, the stand 20 is provided with an image signal connection port 31 for transmitting image signals to the display 11 on the rear portion and the image signal connection port 31 is connected with an image signal cable 32 connected to a computer. Signals for displaying are inputted to the display 11 from the image signal connection port 31 through a cable 33 which is connected to the display unit 10 from the stand 20 through a support 40 joining the display unit 10 with the stand 20.

The support 40 allows the display unit 10, connected to the upper portion of the support, to be located in front of a front section 21 of the stand 20 and the support 40 is formed in a curved shape so as to be operated easily when the support 40 is operated by the cam 30. The curved shape allows the display unit to be located in front of the front section 21 of the stand.

In addition, hinges 41, 41' are provided on the upper and lower portion of the support 40 respectively. Further, the hinges 41, 41' are connected rotatably to the display unit 10 and the stand 20 according as the display unit 10 and a hinge protrusion 41a formed in the stand 20 as well as a hole 41b formed in the support 40 are combined. However, the hinge according to the present invention is not restricted thereto but can be constructed by a shaft as well as another means.

Consequently, the support 40 can be rotated forward and backward centering around the hinge 41 connecting the stand 20. Likewise, the display unit 10 can be rotated forward and backward by the hinge 41' connecting the support 40 to the display unit 10.

Figure 3:
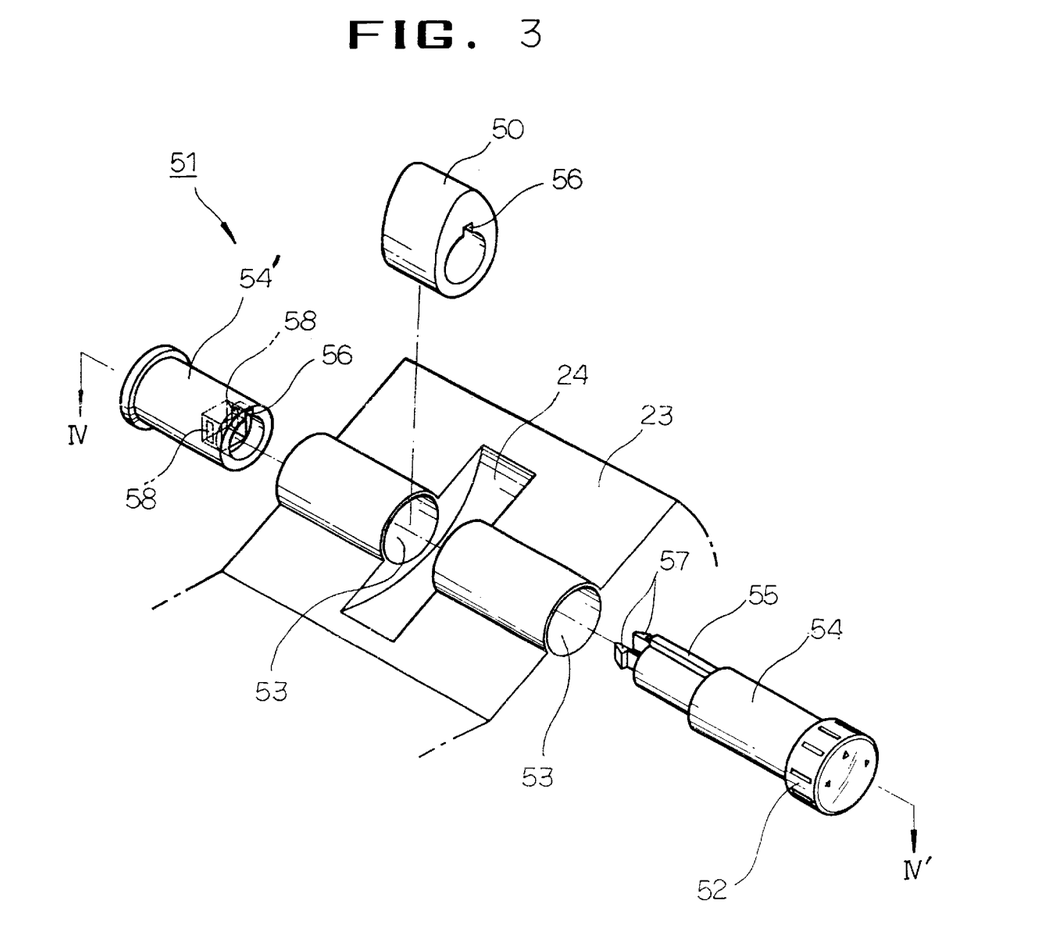
FIG. 3 is an exploded perspective view illustrating an embodiment of a cam and a cam mechanism according to the present invention.
Figure 4:
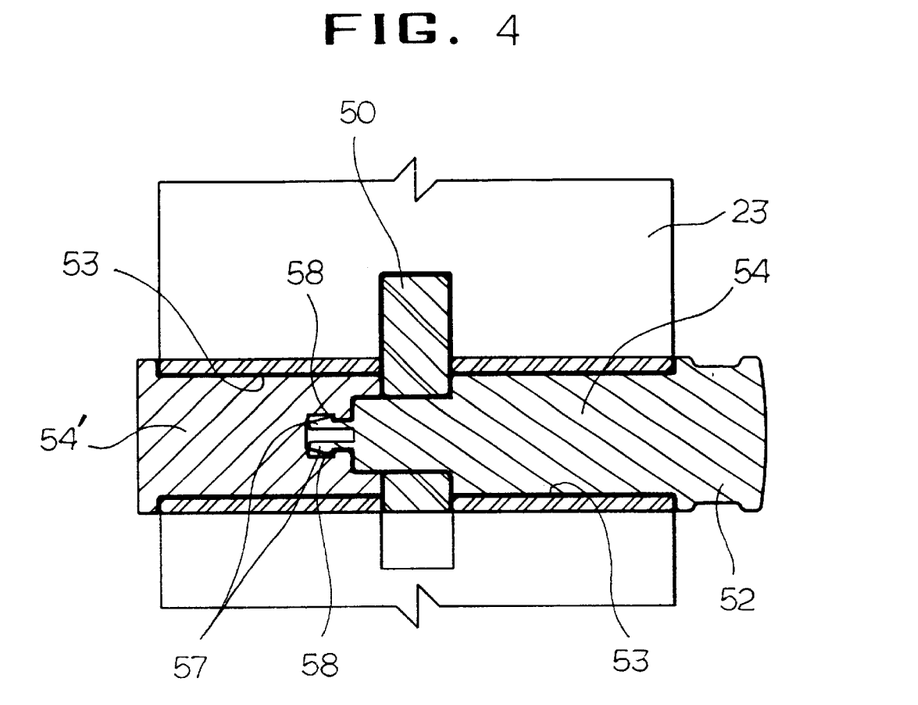
FIG. 4 is a grossly enlargement sectional view of the line IV—IV' of FIG. 3.

Referring to FIG. 3, the stand 20 includes a concavity 24 formed in the middle of the inclined section 23 and a shaft hole 53 formed in both sides of the concavity 24 while the cam mechanism 51 is installed in the concavity 24 and the shaft hole 53. The cam 30 is mounted rotatably on the concavity 24 and respective cam shafts 54, 54' combined with the cam 50 are inserted into the shaft hole 53. As a key 55 formed in the cam shaft 54 is inserted into a key hole 56 formed in the cam 50 and the cam shaft 54' respectively, the cam 50 is rotated by the rotation of the cam shaft 54. Further, as a hook 57 formed in the end portion of the cam shaft 54 is combined with a hole 58 of the cam shaft 54' the cam shafts 54, 54' are connected to each other. One of the cam shafts 54, 54' is provided with a knob 52 for rotating the cam 50.

Figure 5:
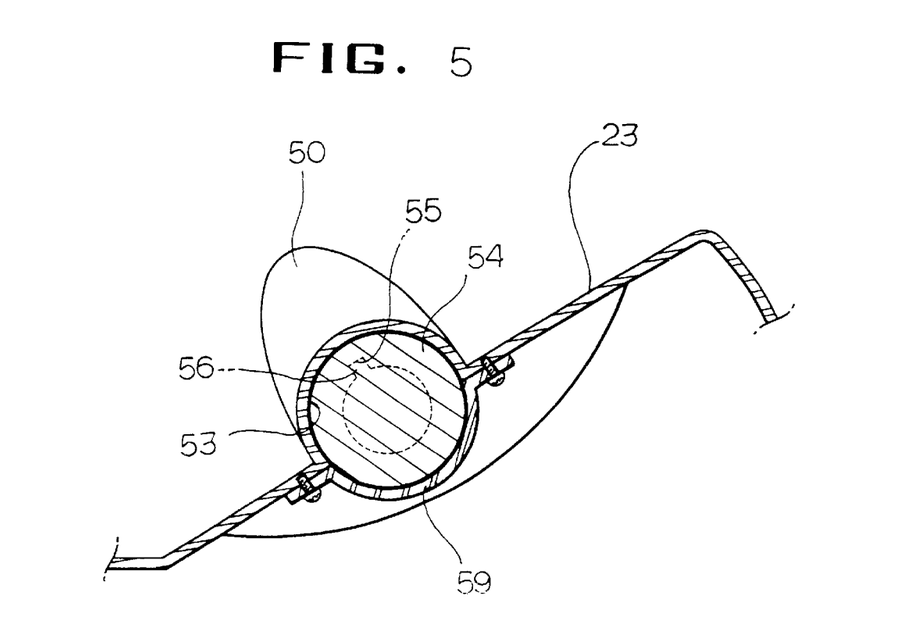
FIG. 5 is a sectional side view illustrating another embodiment of the cam mechanism according to the present invention.

Accordingly, if this cam mechanism 51 is provided with the knob 52 and the cam 50 can be rotated by the rotation of the knob 52, there can be alternative embodiments than those previously described in the specification and illustrated in the preceding drawings. For example, as shown in FIG. 5, the cam shaft 54 can be located in the shaft hole 53, with cam shaft 54 regarded as one member and the cam 50 is provided in the middle of the cam shaft 54, and this whole cam shaft 54 is inserted into the semicircular shaft hole 53 opened by one side, and the part of the opened shaft hole 53 is closed by a part such as a cover 59.

The monitor can be adjusted in first and second display angles. Use of the terms "first" and "second" here is for clarity only. The first and second angles can be adjusted independently in any order.

FIGS. 6a–6b show the adjusting state of the first display angle of the monitor according to the present invention. That is, the cam 50 is rotated by the knob 52 in a side of the stand 20. When the cam 50 is rotated, the cam 50 comes in contact with the support 40 only between a middle dead point a and a top dead point b of the cam 50. That is to say, a rotation range of the cam 50 is 180 degrees and the cam 50 stops rotating as the nose of the cam 50 comes into contact with the bottom surface of the concavity 24.

FIG. 6a shows how the cam 50 is rotated clockwise and the support 40 is contacted with the middle dead point a. Here, as the support 40 comes in contact with a lower point of the cam 50 (the middle dead point), the upper portion of the support 40 and the display unit 10 connected to the hinge 41 come down. In this state, the height of the display 11 is adjusted and this height adjustment can also be explained as an angle adjustment.

In addition, when the cam 50 is rotated, the support 40 is rotated centering around the first hinge 41 located in the lower part of the support 40 and the second hinge 41' of the support 40 connected to the display unit 10 is located before the cam 50. Consequently, the support 40, as shown in FIG. 6a always gives force to the cam 50 by the weight of the display unit 10.

Therefore, when the cam 50 is rotated, the support 40 is rotated pivoting around the first hinge 41 always in contact with the cam 50. As a result, when the cam 50 is rotated clockwise, the angle of the display unit 10 is adjusted to come down and such state makes the display angle be adjusted downward. Further, the display unit 10 is moved forward and comes closer to a user.

FIG. 6b shows how the top dead point b of the cam 50 comes in contact with the support 40 according as the knob 52 is rotated counterclockwise. Here, as the top dead point b of the cam 50, that is, the nose of the cam 50, pushes the support 40 backward and the support 40 is rotated backward pivoting around the first hinge 41, the display unit 10 goes upward. In addition, the display unit 10 is adjusted to move a greater distance from a user.

FIG. 6c shows how the support 40 and a position between the middle dead point a and the top dead point b are adjusted to come into contact. In such an adjusted state too, the support 40 can maintain that state as it is. The cam 50 does not rotate as long as the knob 52 is not purposely rotated even if the cam shafts 54, 54' in both sides of the cam 50 are rotated in the closely combined state within the cam hole 53 and the weight of the display unit 10 gives pressure to the cam 50 through the support 40 in the state that the cam 50 is adjusted to be contacted with the support 40 between the middle and the top dead point.

Accordingly, the display angle can be adjusted upward and downward in the adjustment of the first display angle by the cam 50. Besides, a distance of the forward and backward direction between a user and the display can be appropriately adjusted by the adjustment of the first display angle.

FIG. 7 shows how the second display angle is adjusted. Here, the display unit 10 is rotated centering around the second hinge 41' by a user. In addition, the display angle can be so minutely adjusted by the adjustment of the second display angle as a user pleases.

As explained above, the present invention provides a new type of monitor, a display angle of which can be adjusted by the cam as precisely and minutely as a user pleases.

A Further, the present invention enables a display angle as well as a distance between the display and a user to be adjusted. Furthermore, as many speakers are installed within the stand, the disorganization surrounding the stand which is caused by outside installed speakers can be prevented.

It will be apparent to those skilled in the art that various modifications can be made in the present invention, without departing from the spirit of the invention. Thus, it is intended that the present invention cover such modifications as well as variations thereof, within the scope of the appended claims and their equivalents.

What is claimed is:

1. A liquid crystal display, comprising:
   a stand, comprising:
      two side walls;
      a curved front part;
      a rear part lower in height than said front part;
      an inclined section extending from said rear part to the top of said front part;
      speakers mounted inside the stand along the inside of said front part and said side walls of the stand;
   a support having first and second ends, the first end of said support rotatably connected to the rear part of said stand;
   a display unit for displaying images, said display unit rotatably connected to the second end of said support for adjusting a display angle of the display unit; and
   means located in said inclined section for adjusting a second display angle of the display unit.

2. The liquid crystal display of claim 1, said means further comprising:
   a cam shaft;
   a knob on one end of the cam shaft; and
   a cam in the middle of said cam shaft for moving said support;
   said means being rotatably installed in said inclination section.

3. The liquid crystal display of claim 2, further comprising:
   said support having a concave surface in contact with said cam, for holding the support and the display unit.

4. The display of claim 2, further comprising:
   said inclined section of the stand having a concavity;
   said cam being oval in cross-section, the axis of said cam penetrated by a key hole, said cam rotatably installed in said concavity;
   two shaft holes formed in the inclined section flanking the concavity, said shaft holes aligned with the axis of said cam;
   said camshaft comprising:
   a first camshaft, said first camshaft comprising:
      a key section on the first camshaft; and
      a hook along the axis of the first camshaft at the end of the key section; and
      a knob on the first camshaft on the opposite end from the hook;
      said first camshaft being installed through one shaft hole and the key section being inserted through the key hole of said cam; and
   a second camshaft having a key hole and a hook hole formed in one end, said second camshaft being installed through the second shaft hole, said hook of said first camshaft being inserted into said hook hole and a portion of said key section being inserted into the key hole of the second camshaft.

5. The display of claim 2, further comprising:
   said inclined section of the stand having a concavity;
   said inclined section of the stand having two shaft holes, semicircular in cross-section, flanking the concavity;

a camshaft having a cam and two shaft portions flanking said cam;
    said cam being oval in cross-section, said cam rotatably installed in said concavity and said; and
    said shaft portions rotatably installed in said shaft holes; and
a cover, semicircular in cross-section, mounted to the inclined section and enclosing said shaft portions in said shaft holes.

6. The liquid crystal display of claim 1, further comprising:
    said support being curved from said first to second ends, said curve being concave toward the front of the liquid crystal display.

7. The liquid crystal display of claim 1, further comprising:
    said speaker inside the front part of the stand being for outputting high-pitched sound and said speakers in the sides of the stand being for outputting middle to low-pitched sound.

8. The liquid crystal display of claim 1, further comprising:
    hinge protrusions on the on the upper and lower ends of the support;
    said rear portion of the stand having holes for receiving the hinge protrusions on the lower end of the support; and
    said display unit having holes for receiving the hinge protrusions on the upper end of the support.

9. A liquid crystal display, comprising:
    a display unit displaying images in accordance with signals for displaying;
    a stand supporting said display unit, being provided with a plurality of speakers in a front side as well as both sides, and including a curved front part, a rear part having a lower height than said front part and an inclined part between said front part and said rear part;
    a support supporting said display unit to said stand, having one end portion rotatably connected to a rear side of said display unit and the other end portion rotatably connected to the rear part of said stand; and
    a means located behind an upper portion of said support connected to the display unit in the inclined part of said stand for supporting said support and adjusting an angle of said display unit.

10. The display as claimed in claim 9, wherein said means is rotatably installed in the inclined part of said stand and includes a cam shaft having a knob in one side and a cam provided in a middle of said cam shaft to actuate said support.

11. The display as claimed in claim 10, wherein said support has a concave surface being contacted with said cam forming a part for indirectly adjusting an angle so as to be transmitted a weight of said display unit to the part for indirectly adjusting an angle.

12. The display as claimed in claim 10, wherein said cam, when rotated, is rotatably received in the concave provided in the inclined part of the stand and is stopped by being contacted with a bottom surface of said concave and said cam shaft is closely combined with a shaft hole formed in said stand.

13. The display as claimed in claim 9, wherein a speaker provided in the front part of said stand is for outputting a high-pitched sound while speakers provided in both parts of said stand are for outputting a middle-low pitched sound.

14. A liquid crystal display, comprising:
    a display unit;
    a stand for supporting the display unit, said stand having two side walls and a front part;
    a support extending upwardly and slopingly from said stand to said display unit, one end thereof being pivotally connected to said stand and the other end being connected to said display unit;
    means for adjusting a display angle of said display unit, said means being provided in said stand to contact and to support said support, said means including a cam shaft rotatably mounted on said stand, a knob formed on one end of said cam shaft, and a cam fixed to said cam shaft, said cam contacting a section of said support and rotating by said knob; and
    a speaker mounted inside said stand along one of said front part and said side walls of said stand.

15. The liquid crystal display of claim 14, said stand further comprising:
    said front part being curved;
    a rear part lower in height that said front part; and
    an inclined section extending from said rear part to the top of said front part.

16. A flat panel display, comprising:
    a display unit;
    a stand for supporting said display unit;
    a support extending upwardly and slopingly from said stand to said display unit, one end thereof being pivotally connected to said stand and the other end being connected to said display unit;
    means for adjusting a supporting angle of said support, the means being positioned at a point of said stand which forms a triangle together with a section of said support, the means including a cam shaft rotatably mounted on said stand, a knob formed on one end of said cam shaft, and a cam fixed to said cam shaft, said cam contacting said section of said support and rotating by said knob.

17. The flat panel display of claim 16, said stand further comprising:
    two side walls;
    a curved front part;
    a rear part lower in height that said front part; and
    an inclined section extending from said rear part to the top of said front part.

18. The flat panel display of claim 17, said stand further comprising speakers mounted inside the stand along the inside of said front part and said side walls of the stand.

* * * * *